No. 859,955. PATENTED JULY 16, 1907.
H. F. LIBBY.
TOOL GUIDE.
APPLICATION FILED SEPT. 7, 1906.
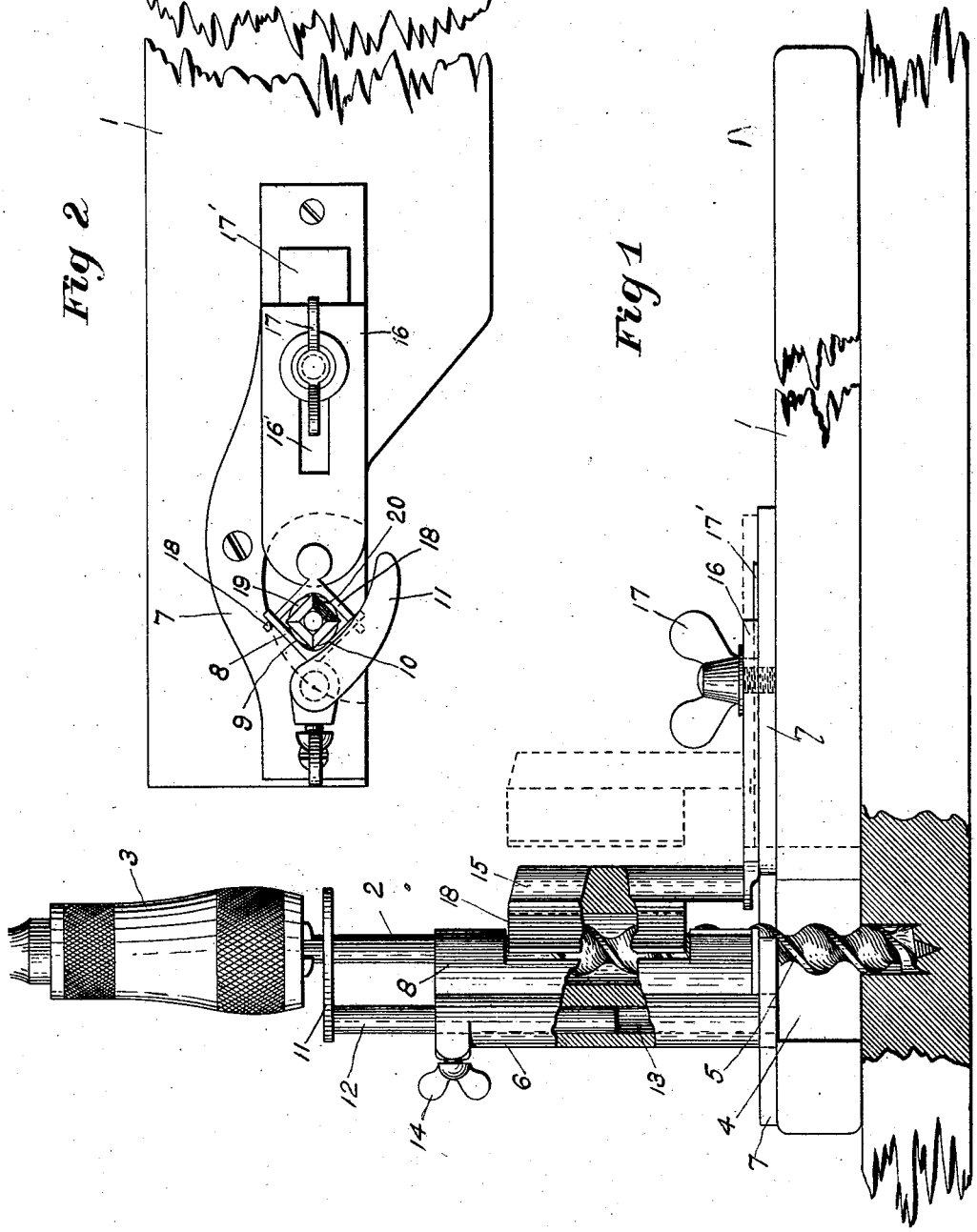
Witnesses.
Irving U. Townsend.
Jesse O. Holton.
Inventor:
Henry F. Libby
by Emery and Booth Attys.

UNITED STATES PATENT OFFICE.

HENRY FORREST LIBBY, OF BOSTON, MASSACHUSETTS.

TOOL-GUIDE.

No. 859,955.            Specification of Letters Patent.            Patented July 16, 1907.

Application filed September 7, 1906. Serial No. 333,650.

*To all whom it may concern:*

Be it known that I, HENRY FORREST LIBBY, a citizen of the United States, residing at Boston, in the county of Suffolk, State of Massachusetts, have invented an Improvement in Tool-Guides, of which the following description, in connection with the accompanying drawings, is a specification, like letters on the drawings representing like parts.

This invention relates to tool guides and particularly to guides for hole forming or hole boring tools.

Having reference to that type or embodiment of my invention herein presented for illustration, in the drawings,—

Figure 1 is a side elevation of one type of tool guide representing the same in guiding relation in full lines and in a non-guiding relation in dotted lines, and showing a tool positioned therein, certain parts being broken away to show more clearly the interior construction; and, Fig. 2 is a plan view of that form of tool guide represented in Fig. 1.

Having reference to that type of the invention here chosen for illustration, the base whereon the tool guide is preferably mounted, is shown at 1, the same being of any material but preferably of wood and shown as broken away between its ends. The said base may be of any desired extent, but as herein shown and preferably it is such that it may be readily applied to the work and firmly held thereagainst by suitable pressure, as by the hand or knee of the user, or clamped thereto, if desired. While a tool guide constructed in accordance with my invention may be adapted for use in connection with tools of various sorts, it is more particularly intended for use in connection with hole forming, and specifically speaking, hole boring tools, applicable to work in metallic or non-metallic materials, in the present instance being shown in connection with a bit 2, having a suitable handle 3. In the use of hole forming or hole boring tools, it is requisite that the holes shall be bored straight or true and usually normal to the plane of the surface of the work. It is apparent, however, that if it be desired to force or form an inclined hole that the base may be suitably secured or positioned at the proper angle to the work, so that the tool may be presented thereto at the correct inclination. In certain branches of carpentry, as, for example, in providing holes for dowel pins, it is sometimes necessary to provide a plurality of spaced holes, and in such case it is quite essential that such holes be truly parallel. A tool guide having a support such as shown, may be readily applied to the work in any position, as, for example, horizontally, in which case the proper pressure may be readily applied with the knee of the user, or, in a vertical position, as, for example, to the edge of a door or the like. The said base is herein shown as having an enlarged opening 4, at or surrounding the point of work penetration of the tool, so that clearance is afforded for shavings or the like resulting from the work.

In order to provide a firm support for the tool, to prevent bending of the latter, and in order truly and accurately to guide the tool to the work, it is preferable to provide guiding means for the tool close to the work. Although in certain aspects of my invention the guide may be located at a distance from the work, yet I find it particularly advantageous for the reasons enumerated and for other obvious reasons, to guide the tool close to the work and in the case of a threaded tool to directly guide a part or all of the threaded portion. A guide positioned adjacent the threaded portion of the tool may, under certain conditions, guide, and, if desired, directly engage the threaded portion 5, throughout the entire circumference thereof; it is in the present type of the invention preferable so to form the guide that it may, if desired, engage the threaded portion at a plurality of circumferentially spaced points, in order to give the proper freedom of operation of the tool. Whether or not the guide directly engages the threaded or outer part of the tool, depends, in the present type of the invention, upon the adjustment of the guide. It may in certain instances be sufficient if the guide be adjacent the tool without actual contact at one or a plurality of points. While the guide may be of any suitable construction and be adapted to guide or to engage either the threaded or non-threaded portion of the tool, I preferably form the same as an expansible guide, in order to adapt it for use with tools of different diameters, and in order the more readily to insert the tool in the guide or to fit the guide properly to the tool. While an expansible tool guide may be formed in a variety of ways, I have in the present type of the invention selected for illustration an expansible tool guide composed of a plurality of parts adapted more or less completely to surround or encompass the tool, such parts being relatively movable, so that the tool and the guide may be brought into proper relation.

Referring now specifically to the type of expansible guide selected for illustration, the stationary member thereof is represented at 6, it being preferably of metal, and having, as herein shown, the flanged lower portion 7, whereby it may be suitably secured to the base or support 1. It is apparent, however, that the fixed member of the guide may be formed integral with the said base 1. The said fixed member 6, of the guide, is herein shown as having two diverging wings 8, which are preferably disposed at right angles to each other and adapted, if desired, to contact with the tool and herein with the threaded portion thereof at preferably two circumferentially spaced points 9 and 10. The said wings may be of any desired longitudinal extent, so as to guide, and, if desired, directly engage any desired portion of the tool and in the present instance may engage substantially the entire threaded portion thereof prior to its entrance into the work or such parts thereof as may be desired. It is apparent that while each wing of the fixed member is shown as continuous, a plurality of preferably axially alined wings may be employed in substitution for each wing of the pair to suitably guide the tool. The fixed member of the guide may be constructed otherwise than as described, so as to suitably guide or position, and, if desired, contact with the tool.

It is desirable in many instances to gage or regulate the depth of work penetration of the tool. I have, therefore, in this type of the invention provided a gage to regulate the work penetration of the tool, and while the same may be constructed in any desired manner, I have herein shown the same as mounted upon the fixed member of the guide and as adjustable therein, the horizontally disposed gage 11, which, as herein shown, is adapted to receive the lower portion of the handle 3 when the proper depth has been secured, having a spindle 12, preferably provided with graduating marks and received within a vertically disposed socket 13, wherein it may be secured at the proper point by any securing means, such, for example, as the wing nut 14.

In the type of expansible guide herein chosen for illustration, I may employ one, or, if desired, a plurality of movable guiding members. In the present instance I have shown a single movable member 15, having a flanged lower member or base 16, preferably having a longitudinal slot 16′ therein, and adapted to be adjustably secured as by a wing nut 17, passing through said slot and engaging the extended flanged portion 7, of the fixed member of the guide, or the base portion 1. Said flange members 7 and 16 may have a suitable dovetailed connection, as indicated at 17′. While the movable member of the guide may have any suitable tool guiding provision, I herein have shown the same as provided with wings 18, corresponding in number and reversely disposed with respect to the wings of the fixed member of the guide. In the present instance said wings are shown as disposed at substantially right angles to each other and as contacting with the threaded portion of the tool at two points 19 and 20. It is apparent that the tool guide may if desired, contact with the tool, whether at the threaded portion or elsewhere, at more than the points shown, and that the guiding, and if desired, contacting portions may be of such area or conformation as is desired. In the present instance the wings of one of the members and herein the movable member, are shown as of less vertical extent than the wings of the fixed member, and as interengaging therewith, each of the wings of the fixed member being for this purpose cut away at one or more points for a suitable portion of their vertical extent to receive the corresponding wings of the opposing member. This construction affords a wing having an extended bearing surface and a tool of any desired diameter may be readily employed therewith.

Having thus disclosed one type or embodiment of my invention, I wish it to be clearly understood that although I have described the same specifically, yet the descriptive terms are not used as limiting terms, but in their generic sense, and that the scope of the invention is set forth in the following claims.

Claim.

1. A guide for a boring tool comprising a plurality of upright guiding members adapted to receive and embrace between them the boring member of the tool thereby sustaining the same close to the work, said tool being thereby guided to its work, each member having a base portion disposed substantially normal to the guiding portion of the member, said base portions being superimposed one upon the other, the lower one of said base portions being supported at a plurality of points disposed longitudinally thereof at opposite sides of the tool whereby the tool may be guided to its work and the guide may be readily supported against the work without clamping and means to secure said base portions in proper relation.

2. A guide for a boring tool comprising a support having a passage for the boring tool, said support being adapted to be applied to the work, a plurality of base members mounted flatwise upon the upper face of said support and within the contour thereof, tool guiding members rising from said base member and adapted to receive and embrace between them the boring member of the tool thereby to support the same close to the work and to direct it to the passage in the support, one of said members having its base portion movably mounted, whereby its tool guiding member may be moved toward and from the other member to accommodate different sizes of boring tools and means to secure said base portions in proper relation.

3. A guide for a boring tool comprising a plurality of upright guiding members adapted to receive and embrace the boring member of the tool between them thereby supporting the same in proximity to the work, each member having a base portion disposed substantially normal to the guiding portion of the member, said base portions being superimposed one upon the other and one of said base portions having a sliding movement relative to the other, that one of said base portions that is fixed to the support being supported at a plurality of points disposed longitudinally thereof at opposite sides of the tool, whereby the tool may be guided to its work and the guide may be readily supported against the work without clamping and means to secure said base portions in proper relation.

4. A guide for a boring tool comprising a plurality of upright guiding members adapted to receive and embrace the boring portion of the tool between them, the tool being thereby guided to its work and supported adjacent thereto, each of said members having a base portion disposed substantially normal to the guiding portion of the member, the guiding portions of the members being located entirely above the base portions thereof whereby a flat lower face is presented directly beneath said base portions so that the device may be applied flatwise to its work and means to secure said base portions in proper relation.

5. A guide for a boring tool comprising a plurality of upright guiding members adapted to receive and embrace the boring portion of the tool between them, the tool being thereby guided to its work and supported adjacent thereto, each of said members having a base portion disposed substantially normal to the guiding portion of the member, the guiding portions of the members being located entirely above the base portions thereof whereby a flat lower face is presented directly beneath said base portions so that the device may be applied flatwise to its work, one of said base portions being superimposed flatwise upon the other and having a sliding movement thereon, that one of said base portions that is stationary being supported at opposite ends of the sliding base portion whereby a firm support is provided for the latter and means to secure said base portions in proper relation.

6. A guide for a boring tool comprising a support adapted to be applied flatwise to the work and having a passage therein for the tool, a lower base portion applied flatwise to the support and thereby sustained throughout its longitudinal extent, an upper base portion applied flatwise to the lower base portion, both of said base portions being within the contour of the support, whereby a stable balanced guide is presented, and upright guiding members rising from said base members and adapted to receive and embrace between them the boring portion of the tool, whereby the boring portion of the tool is supported and guided in proximity to its work and means to secure said base portions in proper relation.

7. A guide for a boring tool comprising a support adapted to be applied flatwise to the work and having a passage therein for the tool, a lower base portion applied flatwise to the support and thereby sustained throughout its longitudinal extent, an upper base portion applied flatwise to the lower base portion, both of said base portions being within the contour of the support, whereby a stable balanced guide is presented, and upright guiding members rising from said base members and adapted to receive and embrace between them the boring portion of the tool whereby the boring portion of the tool is supported and guided in proximity to its work, the upper of said base portions having a sliding movement upon the fixed base portion whereby tools of different sizes may be suitably guided and means to secure said base portions in proper relation.

8. A guide for a boring tool comprising a support adapted to have its lower face applied to the work and having a passage therein for the boring tool, a plurality of guiding members adapted to receive and embrace between them the boring portion of the tool, each of said members having an extended vertical guiding surface partially encompassing the tool to be guided, a base portion for each of said guiding members disposed substantially normal to said guiding members, said guiding members rising from the flat upper face of said support and said base portions being sustained flatwise upon said support from end to end thereof and means to secure said base portions in proper relation.

9. A guide for a boring tool comprising a support adapted to be applied flatwise to the work and having a passage therein for the tool, a lower base portion applied flatwise to the support and secured thereto along its longitudinal extent, said base portion having an opening therein of reduced extent, a second base portion supported upon the first base portion and extending to the opening therein, said second base portion being thereby firmly supported by the first base portion and the support beneath the same, each base portion having a guiding member for the boring portion of the tool rising therefrom, the said boring portion of the tool being thereby sustained and guided close to its work and means to secure said base portion in proper relation.

In testimony whereof, I have signed my name to this specification, in the presence of two subscribing witnesses.

HENRY FORREST LIBBY.

Witnesses:
ARTHUR A. LIBBY,
ANNA B. FITZ.